United States Patent [19]

Tominaga et al.

[11] Patent Number: 5,208,088
[45] Date of Patent: May 4, 1993

[54] OPTICAL RECORDING MEDIUM

[75] Inventors: Junji Tominaga, Kitasaku; Hiroyuki Arioka; Akio Ogawa, both of Saku, all of Japan

[73] Assignee: TDK Corporation, Tokyo, Japan

[21] Appl. No.: 795,443

[22] Filed: Nov. 21, 1991

[30] Foreign Application Priority Data

Nov. 22, 1990 [JP] Japan .................................. 2-320109
Jul. 10, 1991 [JP] Japan .................................. 3-195770

[51] Int. Cl.$^5$ ............................................. B32B 3/02
[52] U.S. Cl. ......................................... 428/64; 428/65;
428/913; 430/270; 369/283; 369/284; 369/286;
346/76 L
[58] Field of Search ........................... 428/64, 65, 913;
430/270; 369/283, 284, 286; 346/76 L

[56] References Cited

U.S. PATENT DOCUMENTS 3,959,799  5/1976  Gambino ........................ 346/76 L

FOREIGN PATENT DOCUMENTS 130089  6/1986  Japan .
2-58743  2/1990  Japan .
235789  9/1990  Japan .

Primary Examiner—Patrick J. Ryan
Assistant Examiner—Marie R. Macholl
Attorney, Agent, or Firm—Watson, Cole, Grindle & Watson

[57] ABSTRACT

An optical recording medium capable of reproduction in accordance with the CD standard is provided. The medium includes a reflective thin film of Ag or similar element, an intermediate thin film of Zn or similar element, and a low-melting thin film of Te or similar element wherein light irradiation causes the reflective thin film element and the low-melting thin film element to diffuse into each other to form an alloy or compound of reduced reflectivity. It is possible to determine through simulation a combination of atoms of the respective thin films which form a cluster having HOMO where electrons in the reflective thin film atoms and electrons in the low-melting thin film atoms do not form a hybrid orbital and LUMO where electrons in the reflective thin film atoms and electrons in the low-melting thin film atoms form a hybrid orbital.

3 Claims, 6 Drawing Sheets

OPTICAL RECORDING MEDIUM

This invention relates to optical recording media, and more particularly, to optical recording media capable of reproduction in the standard compact disk (CD) mode.

BACKGROUND OF THE INVENTION

Optical recording disks and other optical recording media have attracted great attention as high capacity information recording media. The optical recording media include the rewritable type with phase change and magnetooptical properties, and the write-once type with pitforming.

The phase change optical recording media use recording film of a phase changeable alloy which shows its reflectance change between the crystalline and amorphous states or between two different crystalline states. For the phase change type optical recording media with different crystalline states, Ag-Zn alloy is a typical phase changeable alloy as described in Japanese Patent Application Kokai (JP-A) No. 130089/1986. This phase change type optical recording media having Ag-Zn alloy as the recording film, however, show a relatively small change in reflectivity due to the phase change, which cannot satisfy the reflectivity change specification required by the CD standard. The CD standard specifications must also require that information carrying areas, that is, recorded pits, have lower reflectivity than the other non recorded parts. The Ag-Zn alloy as a recording film has a general tendency that light exposed areas, that is, recorded areas increase its reflectivity. Therefore, Ag-Zn alloy cannot satisfy the CD standard by this reason. That is, these phase change type optical recording media with Ag-Zn alloys for recording cannot be used for write-once compact disks.

JP-A 236789/1990 proposes a new optical recording disk satisfying the CD standard. Disclosed is an optical information recording disk having a high reflectivity layer and a low reflectivity layer stacked on an upper surface of a substrate in this order. The high reflectivity layer is formed with an element selected from the group consisting of Au, Al, Ag, Pt, Pd, Ni, Cr, and Co, or an alloy containing such an element or elements, which has high reflectivity more than 70% for incident laser power so that it cannot be a recording material as such. The low reflectivity layer is formed with a material which has high absorption over the incident laser wavelength in the range of 750 to 850 nm, for example, a chalcogen element such as Te. Information is recorded in this optical recording disk by introducing recording light from the substrate upper surface side, that is, the low reflectivity layer side, whereby the chalcogen element of the low reflectivity layer reacts with the element or elements of the high reflectivity layer to form a new alloy. In this way, the light exposed areas reduce its optical reflectivity. Such a change in optical reflectivity can be detected by directing reproducing light with much smaller power than that of recording to the disk from the opposite side, that is, the substrate lower surface side. This configuration is described as providing write-once compact disks.

According to JP-A 235789/1990, the high and low reflectivity layers are formed by sputtering. We prepared optical recording disks of the disclosed configuration using a sputtering process and carried out recording and reproduction on the disks, finding that unrecorded areas had a reflectivity as low as about 14 to 16% and recorded areas had the reflectivity decreased to only about 10%. As a result, these disks could not be reproduced not only in the standard CD mode, but also by means of a driving equipment adapted for phase change type optical recording disks. When a low reflectivity layer of Te was formed on a high reflectivity layer of Ag by sputtering, the mutual diffusion occurred between the layers to form an alloy or a compound between Ag and Te, suggesting that a recorded state was established immediately during sputtering.

It is to be noted that these results were obtained when the high reflectivity layer was formed with about 500 Å thick enough to carry out recording at a linear velocity of 1.2 to 1.4 m/s corresponding to the CD standard. By increasing the thickness of the high reflectivity layer up to about 1000 Å, the influence of interdiffusion during the formation of the low reflectivity layer was reduced so that sufficient reflection is provided by the high reflectivity layer in unrecorded state. However, in this case, it took a long time for the layers to diffuse into each other and recording could not be completed by irradiating recording laser light at the linear velocity prescribed in the CD standard.

In Example 5 of JP-A 235789/1990, a Sb layer and a Te layer are stacked on a high reflectivity layer of Au in this order as low reflectivity layers. A recorded state can already be established at the time of forming the Sb layer since interdiffusion readily happens between Sb and Au.

A further problem arises with this optical information recording disk when recording and reproducing light beams are directed to the disk from the substrate front and the rear surface sides, respectively. This recording must require that the disk must be turned over also need a reversely rotational equipment. Thus a special drive is necessary for recording. Recording light is directed to the disk from the low reflectivity layer side because the high reflectivity layer has a high melting point and low absorption of incident light coefficient, therefore extremely high recording power is necessary if recording light is directed from the substrate sides without the layers.

Additionally, in the design of optical recording medium having such two thin films wherein interdiffusion causes change in its optical reflectivity, actual experiments must be necessary to confirm interdiffusion, thicknesses and other factors of the two films. Therefore, some methods which predict these properties mentioned above without actual experiments to save the time and labor cost are necessary.

SUMMARY OF THE INVENTION

An object of the present invention is to provide a novel and improved optical recording medium capable of reproduction in accordance with the CD standard.

Another object of the present invention is to predict the design of such an optical recording medium by carrying out simulation of the recording mechanism of the medium.

In one form of the invention, these and other objects are attained by an optical recording medium comprising at least one stack including a first thin film and a second thin film on one surface of a substrate. Upon exposure of the stack to light, interdiffusion occurs between atoms constituting the first thin film and atoms constituting the second thin film so that the first thin film changes its reflectivity. The atoms of the top layer of the first film and the atoms of the encountered top layer of the second layer form a cluster between the interface. The electron state of a cluster constructed by the different atoms, in this case, two different element are included, is explained as Highest Occupied Molecular Orbital, HOMO, of the cluster. If HOMO's electron state make a hybrid orbital, the interdiffusion of the two different atoms layer can occur. Otherwise, the two monoatomic layers do not interdiffuse. However, if the calculated Lowest Unoccupied Molecular Orbital, LUMO has a hybrid orbital, even in the case of no hybrid orbital formed in HOMO, some energy, for examples, light, heat or mechanical shock can hop up the electrons of HOMO to LUMO to initiate the interdiffusion.

In the case of interdiffusion of Te and Ag, the formed atomic cluster including Te and Ag form hybrid orbital in HOMO. Therefore, essentially the interdiffusion of those two films must occur.

In one preferred embodiment, at least two stacks are on the substrate surface. The stack may further include a third thin film between the first and second thin films. In this embodiment, the cluster further contains atoms constituting the third thin film. The cluster has an energy difference of about 0.002 to 3 eV between the HOMO and the LUMO.

In another form, the present invention provides an optical recording medium with a reflective thin film on one surface of a substrate, an intermediate thin film thereon, and a low-melting thin film thereon. The reflective thin film contains at least one element selected from the group consisting of Ag, Au, Cu, and Pt as a major component. The intermediate thin film contains at least one element selected from the group consisting of Zn, Al, Sn, In, Cd, Tl, Pb, and Bi as a major component. The low-melting thin film contains at least one element selected from the group consisting of Te, Se, and S as a major component.

Preferably, the intermediate thin film is 10 to 200 Å thick, the reflective thin film is 200 to 700 Å thick, and the low-melting thin film is 200 to 1500 Å thick. The ratio in thickness of the low-melting thin film to the reflective thin film ranges from 1/1 to 5/1.

Also preferably, atoms constituting the reflective thin film, atoms constituting the intermediate thin film, and atoms constituting the low-melting thin film form a cluster. The cluster has a HOMO where electrons in atoms constituting the reflective thin film and electrons in atoms constituting the low-melting thin film do not form a hybrid orbital and a LUMO where electrons in atoms constituting the reflective thin film and electrons in atoms constituting the low-melting thin film form a hybrid orbital. The cluster has an energy difference of 0.002 to 3 eV between the HUMO and the LUMO.

When a reflective thin film of Ag, an intermediate thin film of Zn and a low-melting thin film of Te are in the case, the considered cluster may be $Ag_2Zn_2Te_2$.

As defined above, the optical recording medium according to the present invention includes a substrate, a reflective thin film on one major surface of the substrate, an intermediate thin film thereon, and a low-melting thin film thereon. The low-melting thin film is formed on the reflective thin film via the intermediate thin film by gas phase growth processes such as sputtering as will be described later in detail. We found that an element constituting the intermediate thin film such as Zn is effective for preventing diffusion of an element constituting the low-melting thin film such as Te, the behavior of Zn and similar elements being referred to as locking action. Then during formation of the low-melting thin film, no or little interdiffusion occurs between the reflective and low-melting thin films by the locking effect of the third layer. Then even when the reflective thin film is as thin as about 500 Å, it can be avoided that the reflective thin film changes a recorded state during preparation.

Part of recording laser light directed to the medium from the rear surface side is transmitted by the reflective thin film because of thickness to reflect all the incident light and reaches the intermediate thin film whereby it is heated. Then the intermediate thin film is activated to cancel the locking action, allowing an element of the low-melting thin film and an element of the reflective thin film to diffuse with each other to form an alloy or a compound of these elements. As a result, areas exposed by recording laser light are substantially reduced in optical reflectivity. At this time, an element of the intermediate thin film recorded such as Zn mostly diffuses toward the low-melting thin film.

The resulting optical recording medium is of the write-once type since the change in optical reflectivity is irreversible. The reflectivity to laser light having a wavelength of 780 nm commonly used in the CD standard is 70% or higher before exposure and is substantially reduced to about 30% or lower after exposure of recording laser light. This ensures utility as an optical recording disk of the write-once type satisfying the CD standard.

The intermediate thin film is so endothermic that it may be fully heated with light transmitted by the reflective thin film even when the reflective thin film is of a high reflectivity element such as Ag. Therefore, high recording sensitivity is achieved while maintaining high reflectivity in unrecorded areas.

The optical recording medium of this invention provides high initial reflectivity and reflectivity change enough to satisfy the CD standard not only at a wavelength of 780 nm, but also over a wide wavelength range from about 400 nm to about 900 nm. This suggests the potential ability of laser light with shorter wavelength and possible recording and reproduction at higher density therewith.

We have found that the locking action and diffusion occurrence among the reflective thin film, intermediate thin film, and low-melting thin film can be predicted by the simulation performed by applying the frontier orbital theory heretofore known in the field of organic chemistry to the metal and metal alloy field. If the possibility of interdiffusion between a reflective thin film and a low-melting thin film upon exposure of light can be predicted by simulation, the time, labor and expense spent for the design of a new optical recording medium can be substantially reduced.

DETAILED DESCRIPTION OF THE INVENTION

Arrangement

Figure 1:
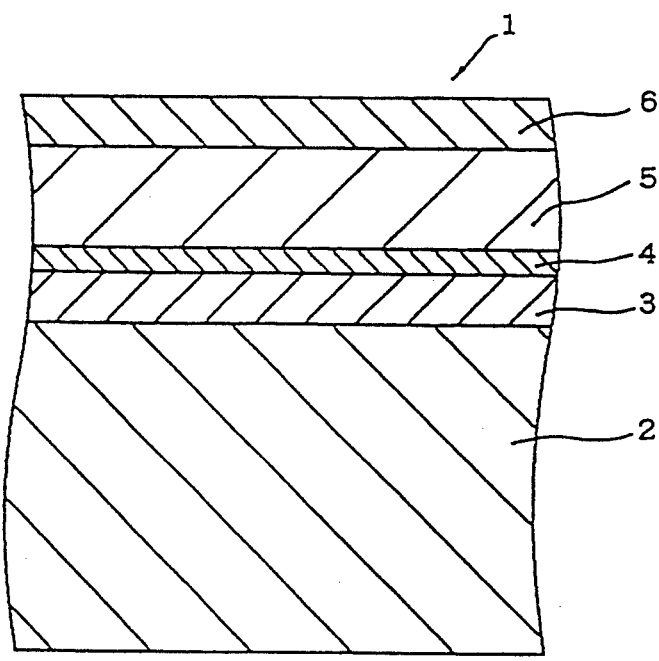
FIG. 1 is a fragmentary cross-sectional view of an optical recording medium according to one preferred embodiment of the invention.

Referring to FIG. 1, there is illustrated an optical recording medium 1 according to the present invention as comprising a substrate 2 having a pair of major surfaces, a reflective thin film 3 on one major surface of the substrate, an intermediate thin film 4 thereon, a low-melting thin film 5 thereon, and a protective film 6 thereon.

The optical recording medium 1 is recorded and reproduced by directing recording light and reproducing light to the reflective thin film 3 through the substrate 2. Thus the substrate 2 should be substantially transparent to light. Such substrates are often formed of various glasses and various resins such as acrylic resins, polycarbonate resins, epoxy resins, and polyolefin resins. The shape and dimensions of the substrate are not critical although it is most often of disk shape and has a thickness of about 0.5 to about 3 mm and a diameter of about 50 to about 360 mm. If desired or necessary, one major surface of the substrate 2 on which the reflective thin film 3 is to be deposited is provided with a predetermined pattern including pits and/or grooves for tracking and addressing purposes.

Deposited on one surface of the substrate 2 is the reflective thin film 3 which contains at least one element selected from the group consisting of Ag, Au, Cu, and Pt as a major component. These elements are selected for the reflective thin film 3 because they can provide high reflectivity over a wide wavelength range and undergo a substantial change in reflectivity as a result of subsequent reaction with the low-melting thin film 5. Silver is most preferred.

It is acceptable that Sb, Sn, In, S and analogous elements is added to the reflective thin film 3. Sb is effective for increasing the rate of interdiffusion between the reflective and low-melting thin films 3 and 5, with the benefits of possible recording with lower power and increased recording sensitivity. Sn and In are also effective for lowering the melting point of the reflective thin film 3, resulting in increased recording sensitivity. These additional elements are preferably added in a total amount of up to 5 atom % in the reflective thin film 3. Excess contents of such an additional element or elements would cause a lowering of reflectivity.

Gas phase growth processes such as sputtering and evaporation are preferred in forming the reflective thin film 3.

Deposited on the reflective thin film 3 is the intermediate thin film 4 which contain at least one element selected from the group consisting of Zn, Al, Sn, In, Cd, Tl, Pb, and Bi as a major component. These elements are selected for the intermediate thin film 4 because they are effective for preventing interdiffusion between the reflective and low-melting thin films 3 and 5 at room temperature and can be readily activated by heating upon exposure to recording laser light to such a state allowing interdiffusion between the reflective and low-melting thin films 3 and 5. Among these elements, zinc is most preferred.

Like the reflective thin film 3, the intermediate thin film 4 is preferably formed by gas phase growth processes.

Deposited on the intermediate thin film 4 is the low-melting thin film 5 which contains at least one element selected from the group consisting of Te, Se, and S as a major component. The low-melting thin film 5 should preferably have a melting point of about 200° to about 400° C. Like the reflective thin film 3, the low-melting thin film 5 is preferably formed by gas phase growth processes.

It is acceptable that Sn and analogous elements are added to the low-melting thin film 5. These additional elements are preferably added in a total amount of up to 5 atom % in the low-melting thin film 5.

The thickness of the respective thin films may be suitably determined in accordance with the desired property for the respective thin films.

In one preferred embodiment, the intermediate thin film 4 has thickness of about 10 to 200 Å, especially about 30 to 120 Å. The intermediate thin film 4 having thickness below the range would be less effective for preventing interdiffusion between the reflective and low-melting thin films 3 and 5, during formation of the low-melting thin film 5. With thickness beyond the range, longer time would be taken for atoms constituting a low-melting thin film, typically Te, to diffuse, resulting in a noticeable lowering of recording sensitivity.

To obtain high modulation, that is, contrast in reflectivity, the ratio in thickness of the low-melting thin film 5 to that of the reflective thin film 3 must have the range from about 1/1 to about 5/1, especially from about 1/1 to about 3/1. The modulation used herein is defined as $(Ro-R)/Ro \times 100\%$ wherein Ro is the optical reflectivity of unrecorded areas and R is the optical reflectivity of recorded areas, that is, areas exposed by recording light.

In one preferred embodiment, the reflective thin film 3 is about 200 to about 700 Å thick, especially about 220 to about 550 Å thick. Initial reflectivity would be low below the range. With thickness beyond the range, longer time would be taken for atoms constituting a low-melting thin film to diffuse, resulting in noticeable lowering of recording sensitivity.

Similarly, the low-melting thin film 5 is about 200 to about 1500 Å thick, especially about 250 to about 550 Å thick. Below the range, reaction between atoms constituting a reflective thin film and atoms constituting a low-melting thin film would occur with a less extent so that a substantial portion of the reflective thin film is left unreacted, and this is not enough to provide a substantial change of reflectivity. Beyond the range, a large amount of the reflective thin film is left unreacted and this is not enough to provide a substantial change of reflectivity.

By selecting the thickness of the respective thin films within the above-defined ranges and relationships a very high modulation of at least 60%, especially at least 70% can be obtained.

The protective film 6 is provided for improving scratch and corrosion resistance. This is usually formed of various organic materials, preferably radiation-curable compounds and compositions thereof which are cured with radiation such as electron radiation and UV light. The protective film may be formed with thickness of about 0.1 to about 100 μm by conventional processes such as spin coating, gravure coating, spraying and dipping.

Reflectivity change

The reflectivity change in the optical recording medium of the above-mentioned structure is described below.

Recording laser light is introduced to the reflective thin film 3 through the substrate rear (lower) side without the films in FIG. 1. Part of laser light is transmitted by the reflective thin film 3 and reaches the intermediate thin film 4 which is thus heated by the transmitted light. The intermediate thin film 4 which has prevented interdiffusion between the reflective and low-melting thin films 3 and 5 at room temperature loses its locking action when heated. At this point, interdiffusion occurs between atoms constituting the reflective thin film and atoms constituting the low-melting thin film, forming a compound or an alloy of these elements which has a substantially reduced optical reflectivity. This reflectivity decrease enables reproduction in accordance with the CD standard.

In forming the low-melting thin film 5 by any gas phase growth process, the reflective thin film 3 does not undergo interdiffusion with the low-melting thin film 5 because the intermediate thin film 4 of Zn or what we claim has locking action, that is, prevents interdiffusion. This locking action is not cancelled by heat associated with sputtering. Therefore, areas where recording laser light is not irradiated, that is, unrecorded areas can maintain high optical reflectivity satisfying the CD standard. A reflectivity of about 95% or higher is obtained in the unrecorded areas especially when the reflective thin film 3 is formed with silver. It will be considered that the reflective thin film 3 must has thickness which can satisfy the initial reflectivity more than 70%, actually in our experiments, 78% to 85%.

Simulation

The locking action and diffusion among the reflective thin film 3, intermediate thin film 4, and low-melting thin film 5 mentioned above can be predicted by simulation utilizing frontier orbital theory heretofore known in the field of Quantum chemistry. However, this theory has normally been applied to organic chemistry. Here we discovered that the theory can be applied to problems related to interdiffusion within thin film structure containing different atoms by considering a cluster of the atoms. An exemplary cluster contains two or more atoms for each of the elements constituting the respective thin films. For an exemplary arrangement including a reflective thin film 3 of Ag, an intermediate thin film 4 of Zn, and a low-melting thin film 5 of Te, the cluster is regarded as consisting of $Ag_2Zn_2Te_2$.

The cluster has a variety of electron orbitals. The most important orbitals are an electron-free orbital having lowest energy named lowest unoccupied molecular orbital (LUMO) and an electron-carrying orbital having highest energy named highest occupied molecular orbital (HOMO).

Figure 4:
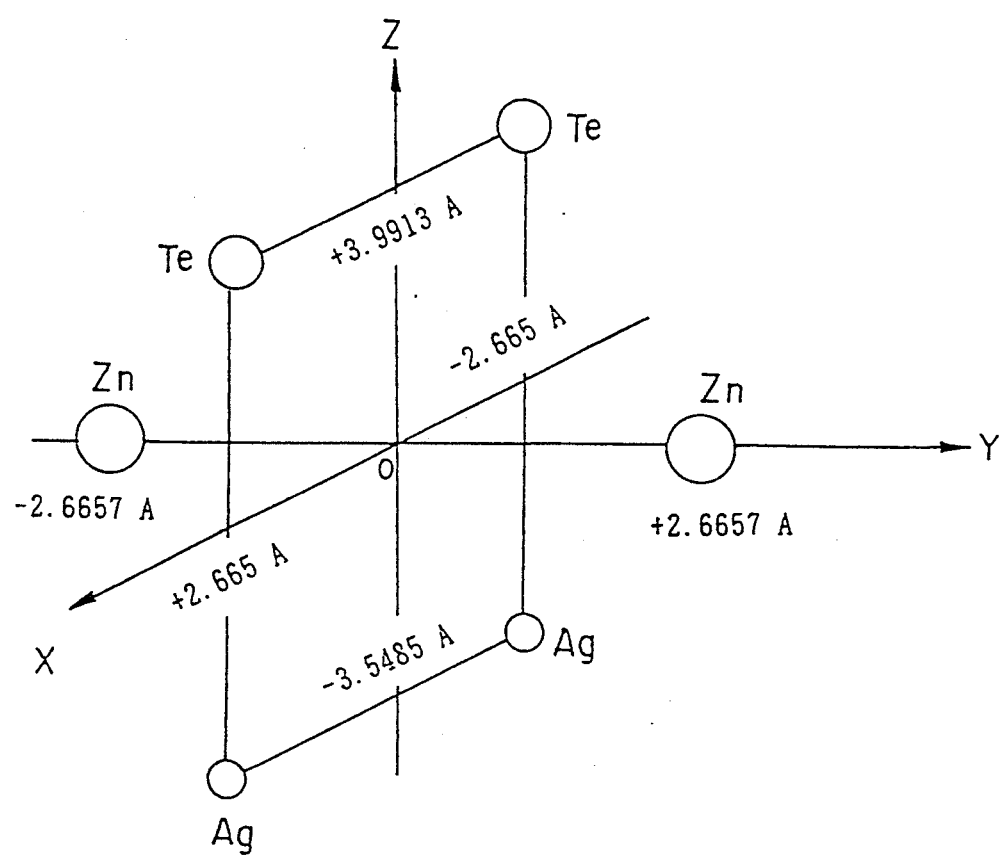
FIG. 4 schematically illustrates the atom arrangement of a cluster $Ag_2Zn_2Te_2$.
Figure 5:
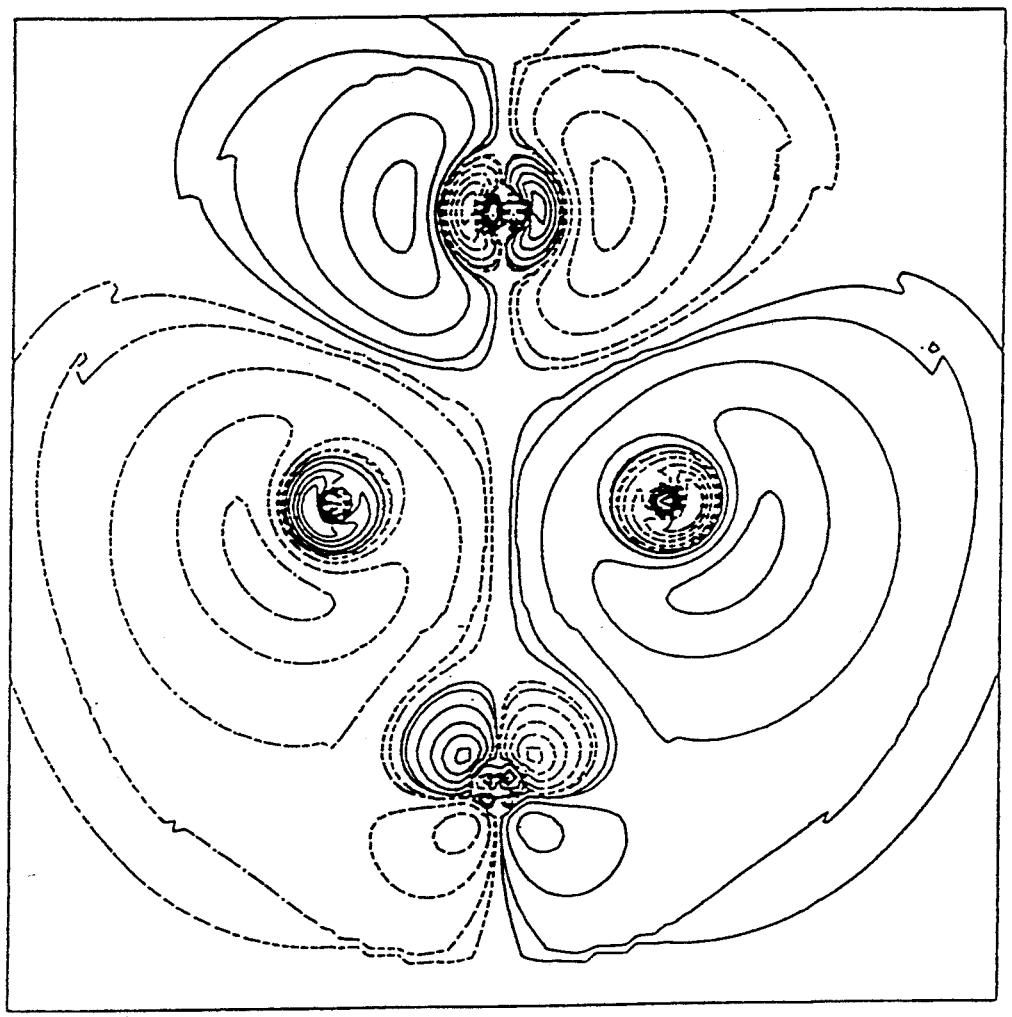
FIG. 5 is a spatial illustration of a wave function representing the electron density distribution in the HOMO of the cluster $Ag_2Zn_2Te_2$.
Figure 6:
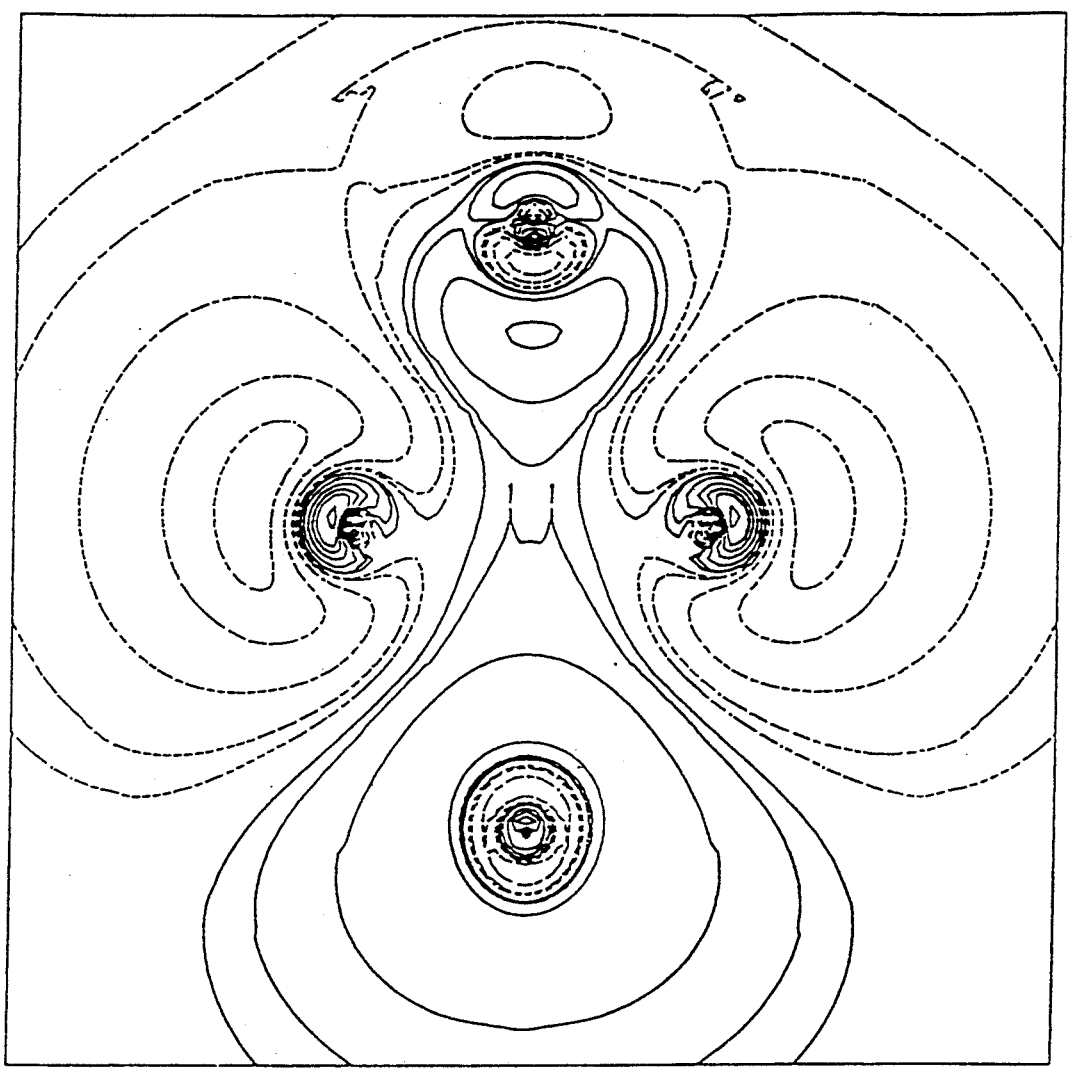
FIG. 6 is a spatial illustration of a wave function representing the electron density distribution in the LUMO of the cluster $Ag_2Zn_2Te_2$.

The cluster is illustrated by referring to FIGS. 4, 5 and 6. FIG. 4 schematically illustrates the atom arrangement in the cluster $Ag_2Zn_2Te_2$. FIGS. 5 and 6 are spatial illustrations of a wave function representing the electron density distribution in the HOMO and LUMO of the cluster, respectively. In FIGS. 5 and 6, the upper atom is Te, the lower atom is Ag, and the left and right atoms are Zn. It will be understood that FIGS. 5 and 6 are plan views of the cluster of FIG. 4 when viewed in x-axis direction. The Te and Ag atoms existing beyond the y-z plane are not represented.

The electron density distributions in the HOMO and LUMO can be determined by the molecular orbital method known as Sw-Xα method. With respect to the detail of Sw-Xα method, reference is made to K. H. Johnson, D. D. Vvedensky and R. P. Messmer, Phys. Rev., B19, 1519 (1979).

In FIGS. 5 and 6, electrons associated with constant electron density lines depicted by solid lines and electrons associated with constant electron density lines depicted by broken lines are different in the sign of spin. There occurs attractive force between electrons with the same sign of spin and repulsive force between electrons with different signs of spin.

It is seen from the HOMO electron density distribution shown in FIG. 5 that two Zn atoms and an Ag atom are firmly bonded because constant electron density contour lines circumscribing each Zn atom are connected to constant electron density lines circumscribing the Ag atom so that electrons in these atoms form a hybrid orbital. It is also seen that the Zn atoms tend to expel out the Te atom. That is, in the HOMO of cluster $Ag_2Zn_2Te_2$, the Zn atoms lock the bond between the Ag and Te atoms.

Also, it is seen from the LUMO electron density distribution shown in FIG. 6 that electrons in a Te atom form a hybrid orbital with electrons in an Ag atom so that the Te and Ag atoms are firmly bonded. That is, if electrons in the HOMO of the cluster $Ag_2Zn_2Te_2$ are excited and jumped up to the LUMO, the locking action of Zn atoms is cancelled, allowing bonding formation Ag atoms and Te atoms to interdiffuse.

By forming the first and the second thin films from two types of atoms in which repulsive force develops in HOMO and attractive force develops in LUMO in the cluster consisting of three types of atoms, and interposing therebetween a third thin film of the remaining one type of atom which exerts locking action in HOMO, there is obtained a recording layer or stack in which the locking phenomenon and the occurrence of diffusion due to energy transfer can be predicted as exemplified by a recording layer in the form of a stack of an Ag film, Zn film, and Te film.

Further, energy necessary to cancel the locking action of the third thin film can be anticipated from the energy difference between LUMO and HOMO of the cluster. More particularly, for the third thin film having thickness of about 10 to 200 A, if the energy difference between LUMO and HOMO of the cluster is from 0.002 to 3 eV, then the locking action can be canceled by a commonly used laser power of (typically up to 15 mW, especially about 10 to 15 mW) at a linear velocity of 1.2 to 1.4 m/s according to the CD standard. This was confirmed by empirical results. In an exemplary cluster of $Ag_2Zn_2Te_2$, the energy difference between LUMO and HOMO was 1.5 eV.

The energy for exciting electrons from HOMO LUMO may be provided in either light or heat form. Excitation by laser light irradiation is due to light energy or light energy combined with thermal energy.

The combination of elements for a recording layer between which diffusion can occur when irradiated with laser light at a linear velocity satisfying the CD standard is speculated from the energy difference between LUMO and HOMO of a cluster considered and thereafter, it is empirically determined whether the reflectivity of the recording layer and its change satisfy the CD standard. With this process, the design of an optical recording medium satisfying the CD standard can be quickly completed. In addition to the CD standard, the above-mentioned simulation can be applied to any other standards.

Of course, the above-mentioned simulation is applicable to an optical recording medium having a recording layer in the form of a stack consisting of the first and the second thin films. The cluster is regarded in this embodiment as consisting of two types of atoms constituting the respective thin films. The electron density distribution in HOMO and LUMO of the cluster is then determined in the same manner as described above. Then determined is a combination of elements in which repulsive force is exerted between the atoms in HOMO since electrons in the respective atoms do not form a hybrid orbital, but attractive force is exerted between the atoms in LUMO since electrons in the respective atoms form a hybrid orbital. It is further speculated from the energy difference between HOMO and LUMO whether or not ordinary recording as optical recording medium is possible. The final step is screening by examining the reflectivity of an alloy or compound formed between the selected elements by diffusion. Exemplary recording layers of two layer structure are Au/Si and Ag/Si. The thickness and thickness ratio of the respective thin films are not particularly limited and may be suitably selected in accordance with various conditions such as particular elements selected for the respective thin films. Often the respective thin films are about 100 to about 500 Å.

A multi-layer recording layer is obtained by reducing the thickness of the respective thin films and placing a plurality of stacks each consisting of two thin films of reduced thickness one on another. Promoted diffusion between each pair of thin films provides for high recording sensitivity, ensuring satisfactory recording with shorter pulse signals. The thickness and number of stacks may be suitably selected in accordance with particular elements selected for the respective thin films, recording linear velocity, and other factors. Often each stack has a thickness of about 30 to about 100 Å and the number of stacks is about 2 to about 5.

It is to be noted that in optical recording media having a recording layer of a two layer structure or of a stack of such two layer structures, an energy difference between LUMO and HOMO of 0.002 to 3 eV is necessary to enable recording at a linear velocity prescribed by the CD standard.

Although the present invention has been described as being applied to optical recording media of the single side recording type corresponding to the CD standard, the invention is also applicable to optical recording media of the double side recording type. Optical recording media of the double side recording type are obtained by mating a pair of substrates such that the reflective thin films thereon face each other.

Also contemplated are optical recording media of the single side recording type having a protective plate bonded to the protective film 6 (FIG. 1). The protective plate may be of the same material as the substrate although other materials are acceptable since it need not be transparent.

EXAMPLE

Examples of the present invention are given below by way of illustration and not by way of limitation.

EXAMPLE 1

An optical recording disk, designated sample No. 1, of a structure as shown in FIG. 1 was prepared by sequentially forming a reflective thin film 3, an intermediate thin film 4, a low-melting thin film 5, and a protective film 6 on one major surface of a substrate 2.

The substrate 2 was a disk injection molded from polycarbonate resin to a diameter of 133 mm and a thickness of 1.2 mm having spiral grooves formed thereon during injection molding. The reflective thin film 3 was of Ag sputtered to a thickness of 250 Å. The intermediate thin film 4 was of Zn sputtered to a thickness of 50 Å. The low-melting thin film 5 was of Te sputtered to a thickness of 500 Å. The protective film 6 was of a UV-curable resin which was applied by spin coating and cured with UV light to a thickness of 5 $\mu$m.

Sample No. 1 was examined for recording/reproducing performance. For recording, a laser beam was irradiated at 12 mW and for reproducing, a laser beam was irradiated at 1 mW. The laser light had a wavelength of 780 nm.

Unrecorded areas had a reflectivity of 87% and recorded areas had a reflectivity of 27%, indicating possible reproduction in accordance with the CD standard.

A test sample was prepared by sequentially forming a reflective thin film 3, an intermediate thin film 4, and a low-melting thin film 5 on one major surface of a glass substrate 2 of 1.5 mm thick in the same manner as in sample No. 1. Using a spectrophotometer, spectral reflectivity was measured. This is designated initial reflectivity.

Figure 2:
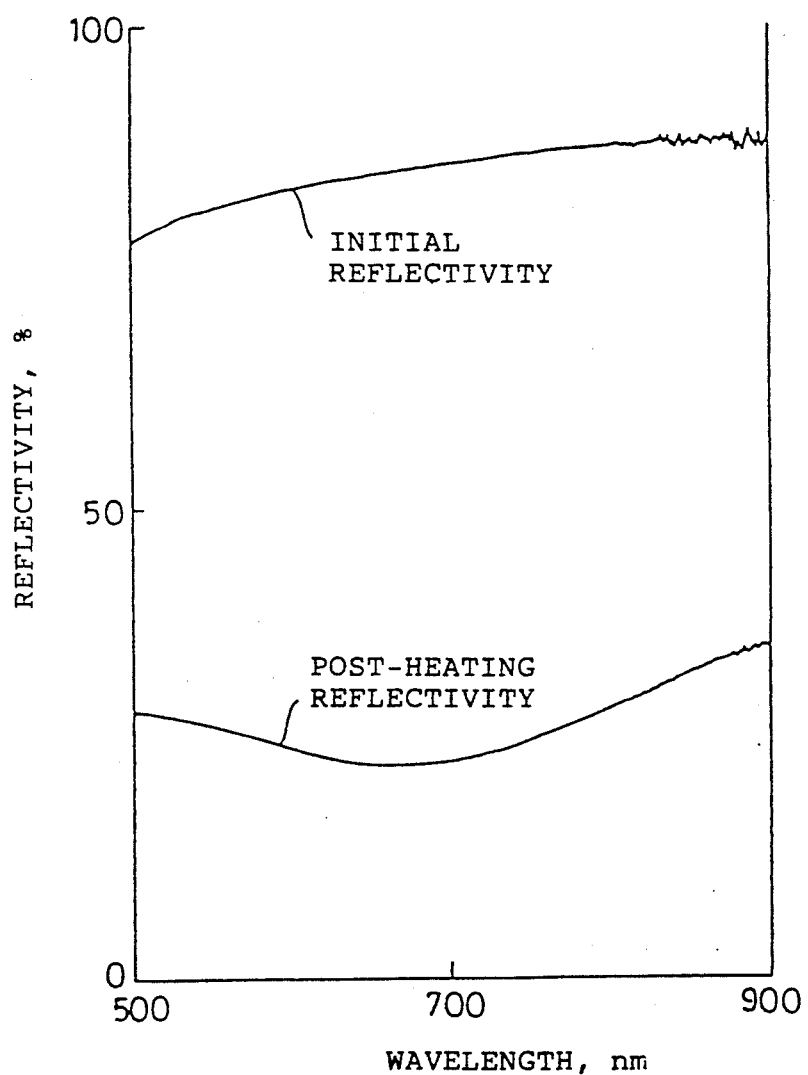
FIG. 2 graphically illustrates the spectral reflectivity of the optical recording medium of Example 1 before and after exposure to recording light.

The test sample was heated at 300° C. for 5 minutes and then cooled down in air before spectral reflectivity was measured again. This is designated post-heating reflectivity. The initial reflectivity and post-heating reflectivity are plotted relative to wavelength in FIG. 2. It is evident from FIG. 2 that the sample No. 1 combination of reflective thin film, intermediate thin film, and low-melting thin film provided fully high initial reflectivity and fully large reflectivity change over a very wide wavelength range.

The results of simulation on the cluster $Ag_2Zn_2Te_2$ associated with Ag, Zn, and Te thin films are as previously described in the disclosure.

EXAMPLE 2

An optical recording disk, designated sample No. 2, was prepared by the same procedure as in Example 1 except that the reflective thin film was an Ag film of 500 Å thick and the intermediate thin film was an Al film of 100 Å thick.

Sample No. 2 was examined for recording/reproducing performance by the same procedure as in Example 1. Unrecorded areas had a reflectivity of 96% and recorded areas had a reflectivity of 20%, indicating possible reproduction in accordance with the CD standard.

A test sample was prepared by sequentially forming a reflective thin film, an intermediate thin film, and a low-melting thin film on one major surface of a glass substrate of 1.5 mm thick in the same manner as in sample No. 2. Using a spectrophotometer, spectral reflectivity was measured. This is designated initial reflectivity.

Figure 3:
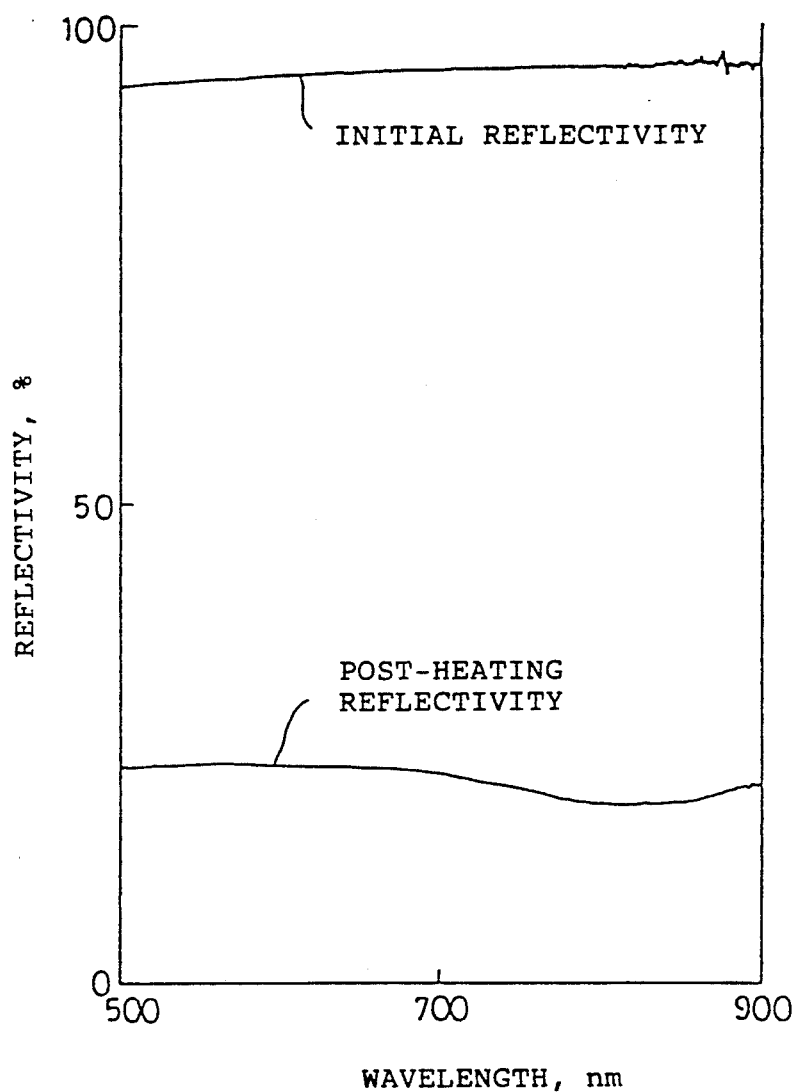
FIG. 3 graphically illustrates the spectral reflectivity of the optical recording medium of Example 2 before and after exposure to recording light.

The test sample was heated at 300° C. for 5 minutes and then cooled down in air before spectral reflectivity was measured again. This is designated post-heating reflectivity. The initial reflectivity and post-heating reflectivity are plotted relative to wavelength in FIG. 3. It is evident from FIG. 3 that the sample No. 2 combination of reflective thin film, intermediate thin film, and low-melting thin film provided fully high initial reflectivity and fully large reflectivity change over a very wide wavelength range.

EXAMPLE 3

Optical recording disk samples were prepared by the same procedure as in Example 1 except that the reflective thin film was formed of Au, Cu or Pt.

Optical recording disk samples were prepared by the same procedure as in Example 1 except that the intermediate thin film was formed of Sn, In, Cd, Tl, Pb or Bi.

Optical recording disk samples were prepared by the same procedure as in Example 1 except that the low-melting thin film was formed of Se or S.

These samples were examined for recording/reproducing performance by the same procedure as in Example 1, obtaining substantially equivalent results. For the combinations of thin films according to these samples, there were obtained equivalent results of spectral reflectivity measurement before and after heating.

There has been described an optical recording medium having a reflective thin film, an intermediate thin film, and a low-melting thin film laminated on a substrate wherein the elements constituting the respective thin films are selected as previously defined such that the reflectivity is about 80% or higher in unrecorded areas and about 30% or lower in recorded areas. The medium can find utility as a write-once type optical recording disk meeting the CD standard.

Such high modulation provides for reproduced signals of increased magnitude, minimizing errors even when the drive apparatus is low in accuracy and reliability.

Since high reflectivity and large reflectivity change are available even in a shorter wavelength range in proximity to 400 nm, a shorter wavelength laser can be used, resulting in increased storage capacity.

The optical recording medium of the invention has high recording sensitivity despite the high reflectivity in unrecorded areas, allowing for recording with lower power laser light. An intermediate thin film of Zn, for example, permits recording with laser light at a reduced power of 12 mW or lower, in some cases, of 8 mW or lower.

In screening potential combinations of respective thin films for optical recording media, simulation can be utilized rather than actual experiments of all combinations. This promises the possibility of quick design of a novel arrangement for optical recording medium.

While we have shown and described particular embodiments of our invention, it will be obvious to those skilled in the art that various changes and modifications may be made without departing from the invention in its broader aspects.

We claim:

1. An optical recording medium, comprising:
   a substrate,
   a reflective thin film on one surface of the substrate containing at least one element selected from the group consisting of Ag, Au, Cu, and Pt and being 200 to 700 A thick,
   an intermediate thin film on said reflective thin film containing at least one element selected from the group consisting of Zn, Al, Sn, In, Cd, Tl, Pb, and Bi and being 10 to 200 A thick, and
   a low-melting thin film having a melting point of about 200 to about 400 degrees C. on said intermediate thin film and containing at least one element selected from the group consisting of Te, Se, and S and being 200 to 1500 A thick.

2. The optical recording medium of claim 1 wherein the ratio of the thickness of said low-melting thin film to the thickness of said reflective thin film ranges from 1/1 to 5/1.

3. The optical recording medium of claim 1 wherein said reflective thin film consists of Ag, said intermediate thin film consists of Zn, said low-melting thin film consists of Te, and said cluster is $Ag_2Zn_2Te_2$.

* * * * *